Oct. 8, 1957 J. K. POLHEMUS 2,808,769
BACK LATCH DEVICE FOR A CAMERA
Filed Nov. 15, 1954

INVENTOR
JOHN K. POLHEMUS
BY
ATTORNEYS 2,808,769

BACK LATCH DEVICE FOR A CAMERA

John K. Polhemus, Binghamton, N. Y., assignor to General Aniline & Film Corporation, New York, N. Y., a corporation of Delaware Application November 15, 1954, Serial No. 468,795

1 Claim. (Cl. 95—11)

The present invention relates to photographic cameras and more particularly to a novel means of latching the back of a camera.

In its preferred embodiment, the present invention will be described in connection with the cover latch for the hinged back of a camera of the twin lens reflex type. As well known with this type of camera, the back cover or closure is usually hinged adjacent the lower edge of the camera and is provided at its upper edge with a latching mechanism cooperating with a latch on the camera body for holding the camera back in its latched or closed position. Means are usually provided for releasing the latch to permit the opening of the camera back for removing the exposed film and substituting fresh film. In the usual prior art constructions, the latch releasing means is readily accessible from the outside of the camera and often results in accidental opening of the camera back with the resultant exposure and spoilage of the film within the camera.

It is, therefore, the primary object of the present invention to provide the latch release member in a concealed position on the camera whereby it cannot be operated when the camera is not being functionally used for taking pictures. In the reflex type camera, there is usually provided pivoted viewing hood members which lie flat against the top of the camera when the camera is not in use and which are pivoted to open or raised position when the camera is in use. In the present construction, the latch release member is positioned at the top of the camera and is normally concealed by the pivoted hood members when in closed position. Thus, when the camera is not in use, there can be no accidental contact with the latch release member to cause opening of the back cover.

Other objects and features will be apparent from the following description of the invention, pointed out in particularity in the appended claims and taken in connection with the accompanying drawing in which:

Figure 1:
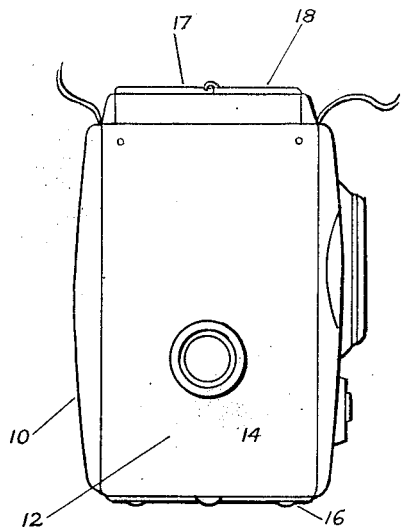
Fig. 1 is a rear elevational view of the camera with the back cover member closed.
Figure 2:
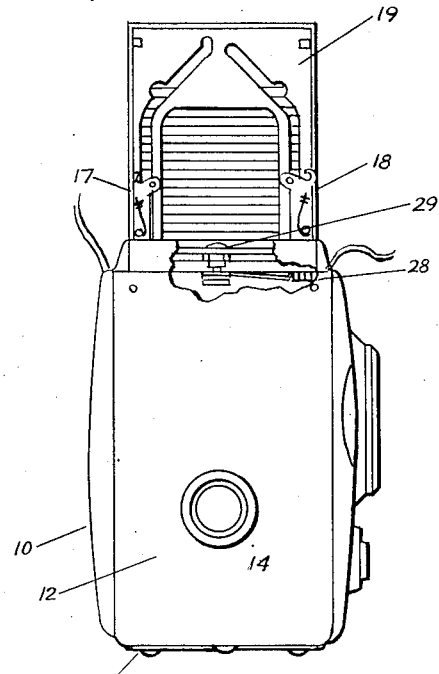
Fig. 2 is a rear elevational view of the camera with the top covers raised exposing the back latch release button.
Figure 3:
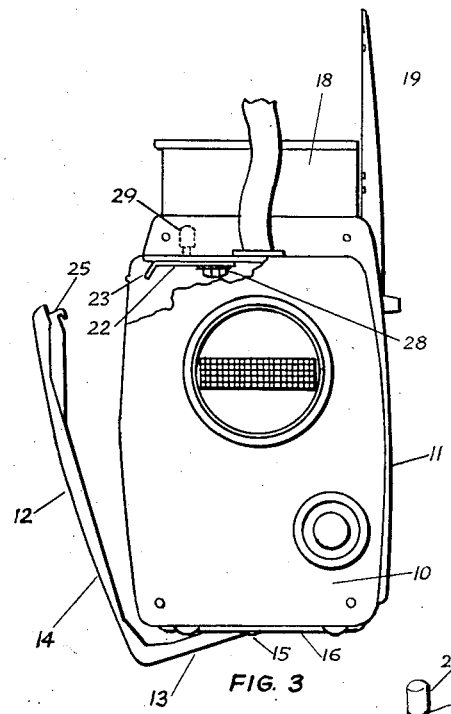
Fig. 3 is a side elevational view of the camera with the back cover open and exposing the back latch proper.
Figure 4:
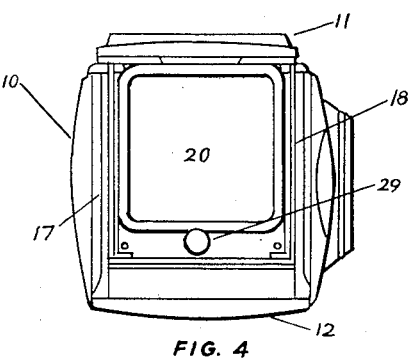
Fig. 4 is a top view of the camera with top covers opened and showing the back latch release button.
Figure 5:
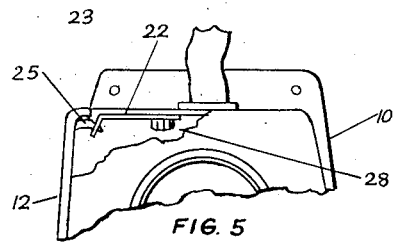
Fig. 5 is a partial view of the top portion of the camera with the side broken away to show the latch mechanism in closed position.
Figure 6:
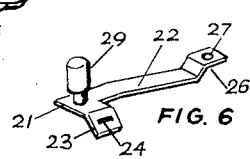
Fig. 6 is a perspective view of the latch member and release button.

Referring now to the drawing, the reflex camera selected for disclosure of the present invention comprises a camera body 10 having the usual lens carrying front wall 11 and rear cover or closure member 12. The latter comprises a bottom wall 13 and a rear wall 14, said closure being hinged at 15 to the camera bottom 16.

The hood members 17 and 18 are pivotally secured to the top of the camera and cooperate with the sliding cover member 19 when in open position to form a hood for the ground glass 20. The sliding cover member 19 in its normal down position serves as a protective covering for the camera lenses and when raised or lowered serves to open or close the hood members 17 and 18.

The latching mechanism 21 comprises a flat plate 22 of resilient metal having an angular portion 23 provided with a slot 24 to receive the hook 25 on cover 12. The plate 22 includes a bent portion 26 having an opening 27 to receive a rivet or similar fastening means 28 for mounting the latching mechanism to the underside of the top wall of the camera. A latch release button 29 is mounted on the plate 22 adjacent the angular portion 23 and extends through the top wall of the camera midway of the two side walls of the camera. The upper end of the button is spaced inwardly of the top rear edge of the camera and lies beneath the hood members 17 and 18 when in closed position.

In operation, the front cover 19 is raised, which in turn raises the hood members 17 and 18 thereby revealing the latch release button 29. To open the back cover 12 for access to the interior of the camera for removing the exposed roll of film or for inserting a new roll of film, the release button 29 is pushed downward, thereby moving the latch member 21 downwardly causing withdrawal of the portion 23 from engagement with the hook 25 from slot 24 and permitting opening of the back cover 12. When the hood members 17 and 18 are closed, they completely cover the release button 29, thus preventing any accidental opening of the camera back or cover 12.

From the foregoing description, it is readily apparent that the relatively simple structure shown and described is well adapted to accomplish the objects and advantages of the present invention. Although a preferred embodiment has been shown, it will be understood that minor changes may be made in the details of construction without departing from the spirit of the invention as defined in the appended claim.

I claim:

A photographic camera of the twin lens reflex type comprising a body having an opening at the rear thereof, a pivoted cover for said opening, pivotally mounted hood members covering the top of the camera when in closed position and pivotally secured to the top of the camera, a latching mechanism secured to the top of the camera, said latching mechanism comprising a spring plate having one end anchored to the lower surface of the camera top, latch means at the other end of the plate, means on the cover cooperating with said latch means to hold the cover in latched position, and manually operable latch releasing means on said plate adjacent the latch means, said latch releasing means extending through the camera top and lying beneath the pivoted hood members whereby said latch releasing means is inaccessible when the hood members are in closed position.

References Cited in the file of this patent

UNITED STATES PATENTS

| 654,791 | Graf | July 31, 1900 |
| 1,979,719 | Weisse | Nov. 6, 1934 |
| 2,664,799 | Wilkinson | Jan. 5, 1954 |

OTHER REFERENCES

Modern Plastics (pub.), vol. 25, No. 11, July 1948, page 108.